United States Patent
Billard et al.

(10) Patent No.: US 8,174,498 B2
(45) Date of Patent: May 8, 2012

(54) MULTI-DIRECTIONAL NAVIGATION BETWEEN FOCUS POINTS ON A DISPLAY

(75) Inventors: Christopher Dale Billard, Mississauga (CA); Eric Mah, Mississauga (CA)

(73) Assignee: Research In Motion Corporation, Waterloo, Ontario (CA)

( * ) Notice: Subject to any disclaimer, the term of this patent is extended or adjusted under 35 U.S.C. 154(b) by 548 days.

(21) Appl. No.: 12/390,984

(22) Filed: Feb. 23, 2009

(65) Prior Publication Data

US 2010/0097319 A1    Apr. 22, 2010

Related U.S. Application Data (60) Provisional application No. 61/106,228, filed on Oct. 17, 2008.

(51) Int. Cl.
*G06F 3/033* (2006.01)
(52) U.S. Cl. .................. 345/157; 345/167; 345/160
(58) Field of Classification Search .................. 345/156, 345/157, 161, 162, 167, 160
See application file for complete search history.

(56) References Cited

U.S. PATENT DOCUMENTS

| | | | |
|---|---|---|---|
| 7,055,108 B2 | 5/2006 | Goloshubin | |
| 2004/0041837 A1 | 3/2004 | Yamaguchi et al. | |
| 2005/0212766 A1* | 9/2005 | Reinhardt et al. | 345/157 |
| 2006/0158428 A1* | 7/2006 | Lazaridis et al. | 345/157 |

OTHER PUBLICATIONS

European Patent Application No. EP 09 15 3478, Search Report dated Jun. 23, 2009.

* cited by examiner

*Primary Examiner* — Adam R Giesy
(74) *Attorney, Agent, or Firm* — Perry + Currier Inc.

(57) ABSTRACT

A method and apparatus for navigating between different focus points displayed on an electronic device, comprising, for each of said different focus points, maintaining a list of any adjacent ones of said focus points to which focus can move in each direction responsive to a navigation event in said direction, for each said list having only one adjacent focus point moving focus to said one adjacent focus point responsive to said navigation event, and for each said list having more than one adjacent focus point accessing a memory setting and moving focus to a predetermined one of said adjacent focus points responsive to said navigation event in accordance with said memory setting.

13 Claims, 10 Drawing Sheets

MULTI-DIRECTIONAL NAVIGATION BETWEEN FOCUS POINTS ON A DISPLAY

The present specification relates generally to electronic devices, and in particular to a method and apparatus for navigating between different focus points displayed on an electronic device.

BACKGROUND

Multidirectional pointing devices are known in the art for providing navigation between different focus points displayed on an electronic device, such as a smart phone, Personal Digital Assistant (PDA), portable electronic game, etc. Examples of such pointing devices include trackballs and +-shaped navigation buttons that are commonly found on electronic game controllers for providing on-screen navigation in four directions: up, down, left and right. When multiple application icons and/or user interface buttons and/or item lists are displayed on a device home screen, it is possible to move focus between icons/buttons/lists (i.e. different focus points) by moving the pointing device upward, downward, left and right.

It is contemplated that such electronic devices may also provide customizable home screens wherein the applications/buttons/lists, etc. may be placed anywhere on the home screen of the electronic device. The implementation of such customizable home screens gives rise to a problem of how movement of the pointing device will move the focus between the different points. This problem can be particularly challenging when a one-to-many mapping is defined between focus points. In addition, a navigation model that is appropriate for one home screen may not work for other home screens.

Consequently, it is desirable to provide a method and apparatus for navigating between different focus points displayed on an electronic device, to accommodate multiple different customizable home screens.

BRIEF DESCRIPTION OF THE DRAWINGS

The embodiments will be better understood with reference to the following Figures in which like numerals denote like parts and in which.

DESCRIPTION OF PREFERRED EMBODIMENTS

In general, a method and apparatus are provided for navigating between different focus points displayed on an electronic device.

According to one aspect, there may be provided an electronic device, comprising a display for displaying different focus points; a multi-directional input device for generating navigation events in multiple directions; a memory for maintaining a list for each of said different focus points of any adjacent ones of said focus points to which focus can move in each direction responsive to a navigation event in said direction and a memory setting for each said list having more than one adjacent focus point; and a processor for accessing said memory responsive to a navigation event in one of said multiple directions and in the event said list has only one adjacent focus point then moving focus to said one adjacent focus point and in the event said list has more than one adjacent focus point then moving focus to a predetermined one of said adjacent focus points in accordance with said memory setting.

According to another aspect, there may be provided a method of navigating between different focus points displayed on an electronic device, comprising for each of said different focus points maintaining a list of any adjacent ones of said focus points to which focus can move in each direction responsive to a navigation event in said direction, for each said list having only one adjacent focus point moving focus to said one adjacent focus point responsive to said navigation event; and for each said list having more than one adjacent focus point accessing a memory setting and moving focus to a predetermined one of said adjacent focus points responsive to said navigation event in accordance with said memory setting.

Figure 1:
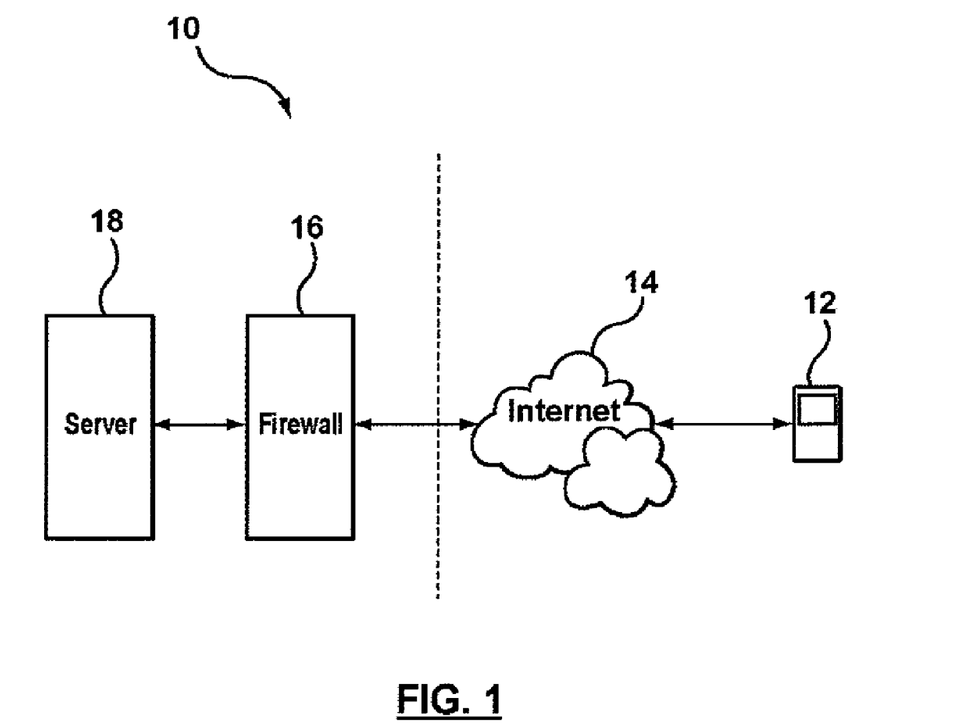
FIG. 1 is a simplified block diagram of a wireless communication system.

FIG. 1 is a simplified block diagram of an exemplary communication system 10 for a portable electronic device 12. According to the illustrated embodiment, the portable electronic device 12 is operable to effect communications over a radio communications channel and communicates with a base station (not shown) while located within a coverage area that is defined by the base station. However, the portable electronic device 12 is not limited to a device capable of effecting communications. Indeed, the exemplary method of navigating between different focus points set forth in greater detail below, may advantageously be implemented within a multitude of devices, some of which are capable of communications and others of which are not (e.g. PDAs, mobile phones, smart telephones, laptop computers, electronic games, GPS receivers, etc.).

In the illustrated embodiment, the base station is part of a wireless network that is in communication with the Internet 14. Data is delivered to the portable electronic device 12 via wireless transmission from the base station. Similarly, data is sent from the portable electronic device 12 via wireless transmission to the base station.

It will be appreciated that the portable electronic device 12 of FIG. 1 is movable within a coverage area of the base station and can be moved to coverage areas defined by other base stations. Further, as will be understood by one of ordinary skill in the art, wireless networks include GSM/GPRS, CDPD, TDMA, iDEN, Mobitex, DataTAC networks, EDGE, EVDO or UMTS and broadband networks such as Bluetooth and variants of 802.11.

A server 18 handles wireless client requests from the portable electronic device 12. A firewall 16 is provided between the server 18 and the Internet 14. The server 18 further operates as a Mail Server, which communicates with an email client of the portable electronic device 12 to allow a user to send and receive email messages.

Figure 2:
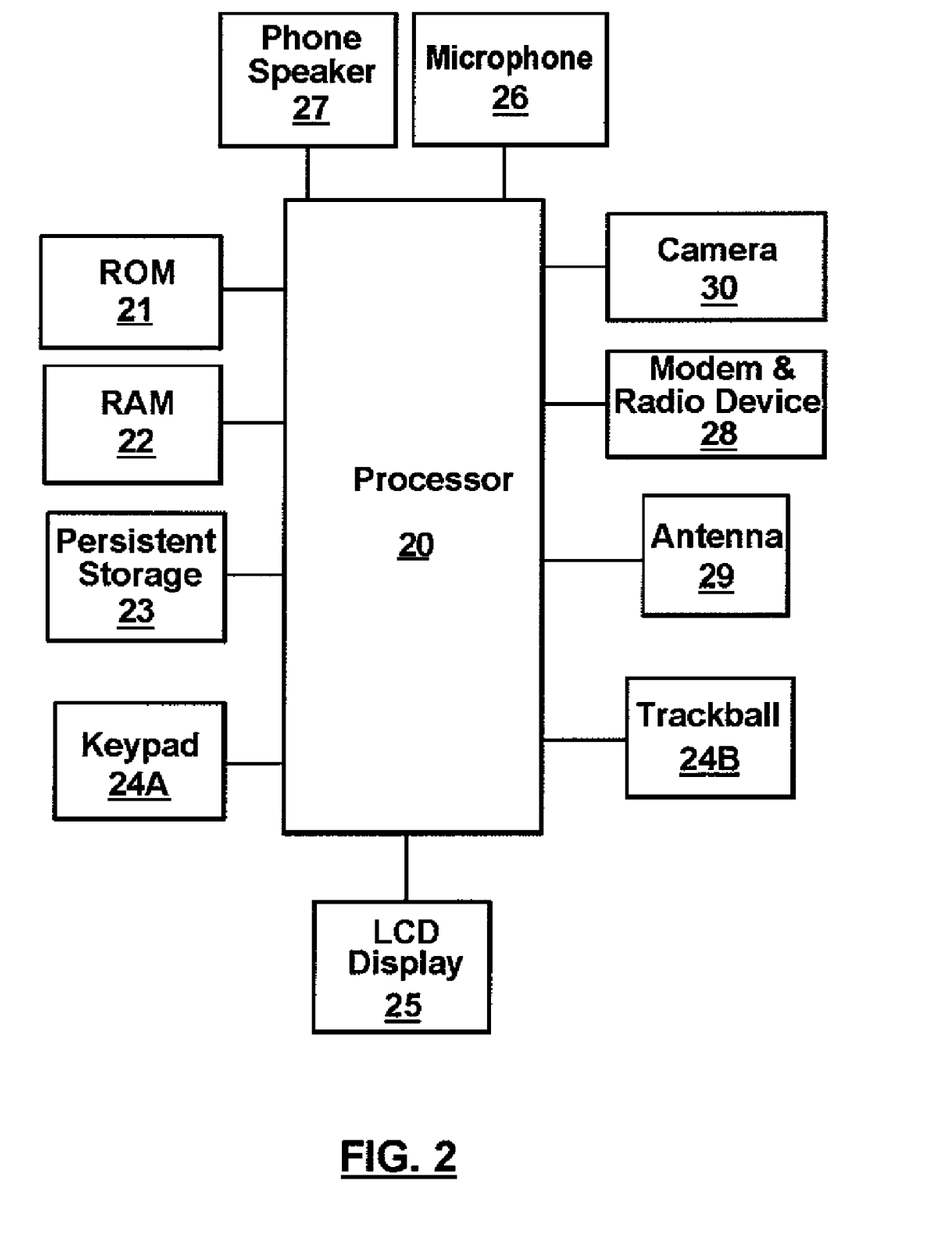
FIG. 2 is a block diagram of components of a portable electronic device.

FIG. 2 is a block diagram showing certain components within an exemplary embodiment of the portable electronic device 12. The portable electronic device 12 includes a processor 20 connected to a read-only-memory (ROM) 21 that contains a plurality of applications executable by the processor 20 for enabling each portable electronic device 12 to perform certain functions including, for example, Personal Identification Number (PIN) message functions, Short Message Service (SMS) message functions, address book and calendaring functions, camera functions, and cellular telephone functions. More particularly, processor 20 may execute applications within ROM 21 for notifying the user of events such as incoming calls and/or emails, appointments, tasks, etc. The processor 20 is also connected to a random access memory unit (RAM) 22 and a persistent storage device 23 to facilitate various non-volatile storage functions of the portable electronic device 12. The processor 20 receives input from one or more input devices, including a keypad 24A and a multi-directional device such as a trackball 24B. Other multi-directional devices are contemplated, such as touch pads, +-shaped game buttons, etc. The processor 20 outputs to one or more output devices, including a Liquid Crystal Display (LCD) display 25. A microphone 26 and phone speaker 27 are connected to the processor 20 for cellular telephone functions. The processor 20 is also connected to a modem and radio device 28. The modem and radio device 28 is used to connect to wireless networks and transmit and receive voice and data communications through an antenna 29. A camera 30 provides functionality for taking pictures that can be viewed on display 25, sent to other users via wireless email, saved to persistent storage 23 for later viewing, etc.

In the context of this specification and the exemplary embodiment illustrated in the drawings, "user interface" comprises an input device (such as keypad 24A, trackball 24B, etc.) and at least one graphical window displayed via an output device (such as display 25).

According to a first aspect of this detailed description, as shown in FIGS. 3A-3D, the user interface of portable electronic device 12 may be configured according to a plurality of customizable home screens wherein buttons, application icons, lists, etc. may be placed anywhere on the display 25. As discussed above, in order to accommodate such customizable home screens a method is provided for defining how movements of the trackball 24B result in moving the focus between different focusable points (i.e. buttons, application icons, etc).

For example, it may be desirable to move focus from one point to one of a plurality of other points when the trackball 24B is moved in a single direction (e.g. a common theme results in pushing up from any application always to an Options application, while pushing down from the Options application returns to the previous application).

FIGS. 3A-3D depict several examples of home screens according to different customizable themes that provide for navigation between different focus points displayed on electronic device 12, according to exemplary embodiments.

Figure 3A:
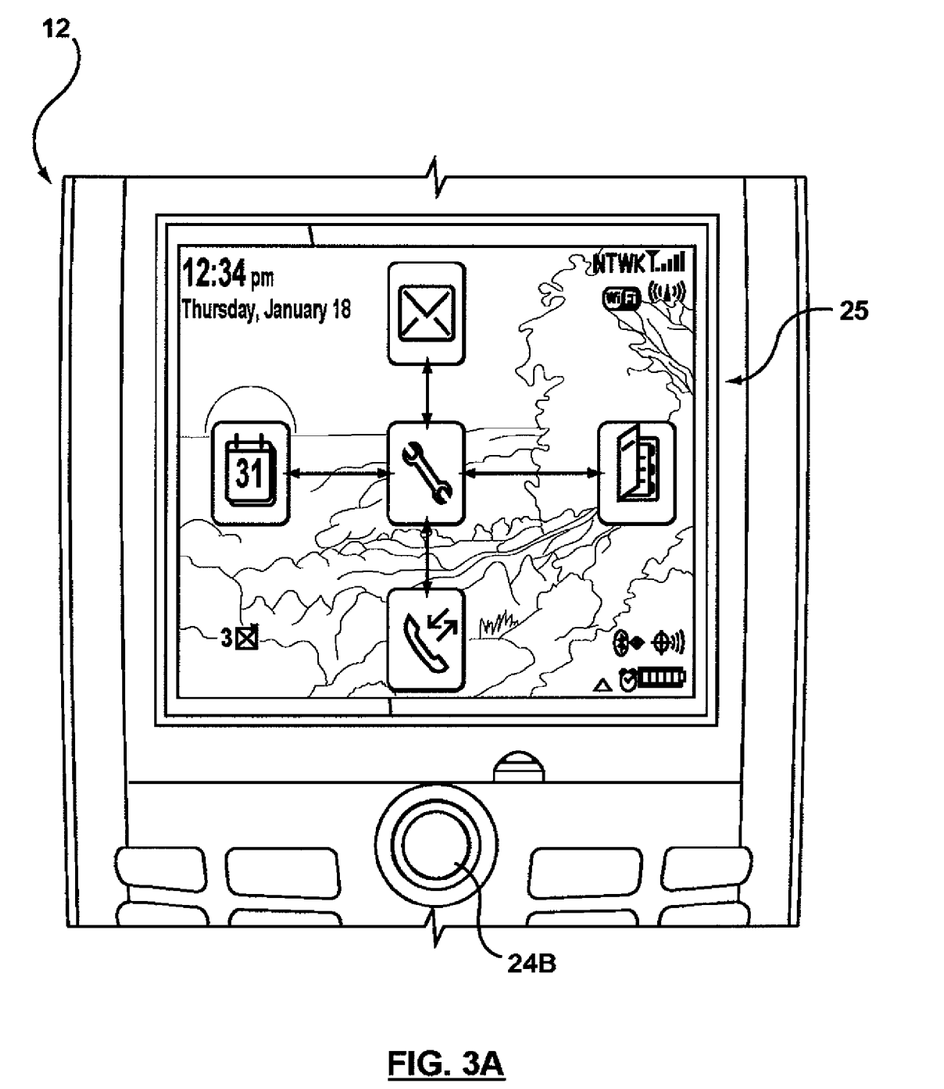
FIGS. 3A-3D are screen shot representations of a graphical user interface of the portable electronic device in FIG. 2 showing exemplary home screen configurations having icons representing different focus points.

In FIG. 3A, an exemplary home screen is shown with five application icons: a central 'Options' application icon surrounded by Messages, Address Book, Phone and Calendar application icons, wherein navigation paths between the applications are illustrated using double-sided arrows. These navigation arrows are illustrated for the purpose of explaining the exemplary method but would not, normally, be shown on the display 25 during ordinary usage. Thus, from the Options application (center) pushing trackball 24B in any direction (up, down, left or right) will result in focus moving to the application icon positioned in that direction (i.e. Messages, Phone, Calendar or Address Book, respectively).

As described in greater detail below with reference to FIG. 4A, a solution to the configuration of FIG. 3A, wherein it is desirable for focus to always return to a predetermined application, may be provided by implementing a memory configuration wherein the device 12 does not need to 'remember' any previous point. Rather, device 12 may be programmed to return focus to the same application each time trackball 24B is moved in the direction of that application. This implementation of memory is referred to herein as "None" since the device 12 does not need remember any previous focus points.

Figure 3B:
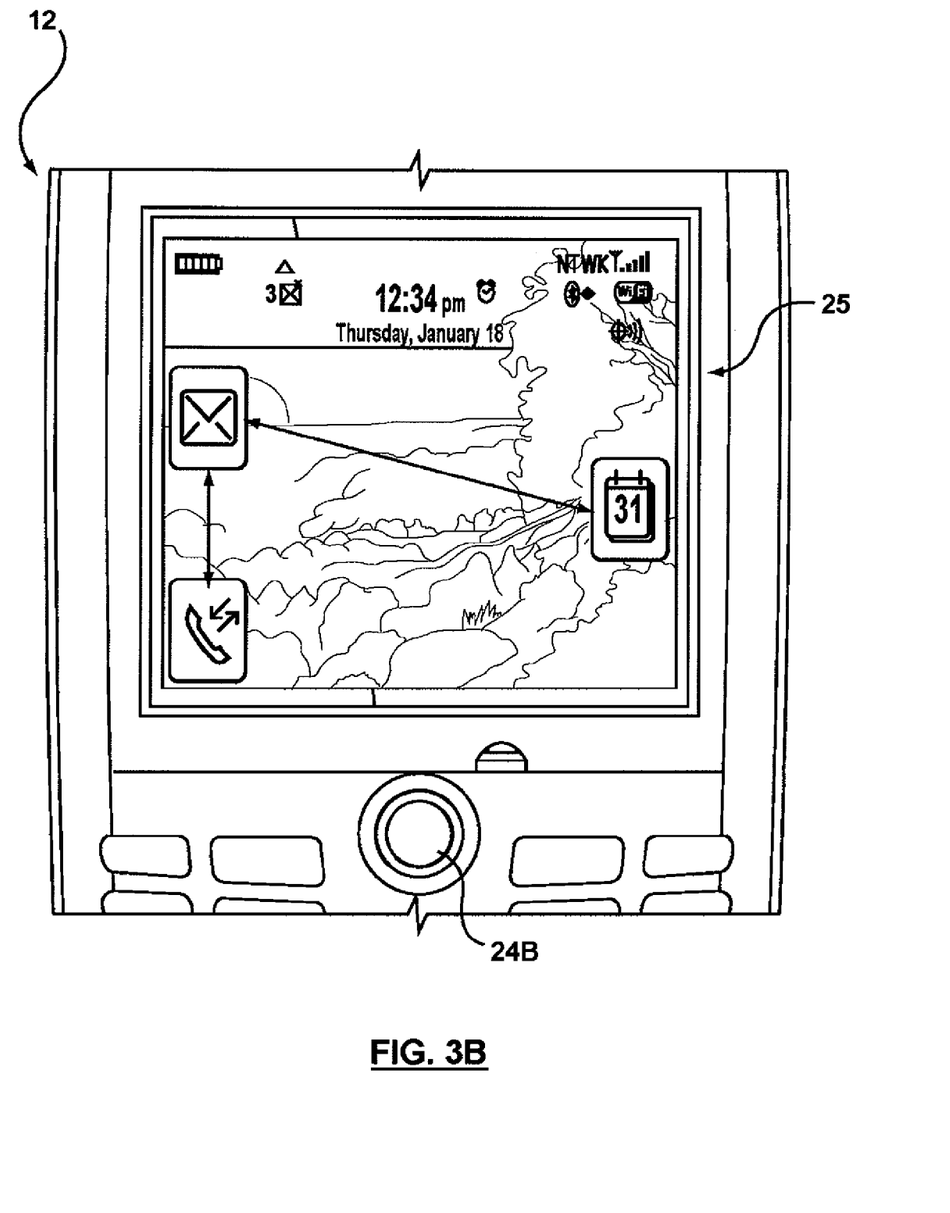

In the example of FIG. 3B, a home screen theme has been constructed such that two navigation paths exist to the left of the Calendar application. That is, pushing trackball 24B to the right when either of the Messages or Phone application icons is in focus will result in focus moving to the Calendar application icon. However, a problem arises if trackball 24B is pushed to the left when the Calendar application icon is in focus since it is unclear which of the Messages or Phone application icons should gain focus. In some configurations, it may be desirable that focus should return to the previous application icon (i.e. pushing the trackball 24B right from Phone to Calendar means that pushing the trackball 24B to the left from the Calendar icon will return focus to the Phone icon). In other configurations, it may be desirable that focus should always return to a predetermined application regardless of which application icon focus came from (i.e. pushing the trackball 24B left from the Calendar icon always returns focus to Messages, even if focus previously shifted right to Calendar from Phone).

As described in greater detail below, a solution for configurations in which it is desirable that focus should return to the previous application icon is provided by 'remembering' the last focus point from which focus has been obtained. Thus, device 12 may be programmed to save the last icon from which focus has been received. In the example of FIG. 3B if the Calendar application icon obtains focus from the Phone application, then when trackball 24B is next pushed to the left it must return focus to the Phone application icon. This implementation of memory is referred to herein as "one-step memory" since device 12 is required to store only one previous shift in focus.

Figure 3C:
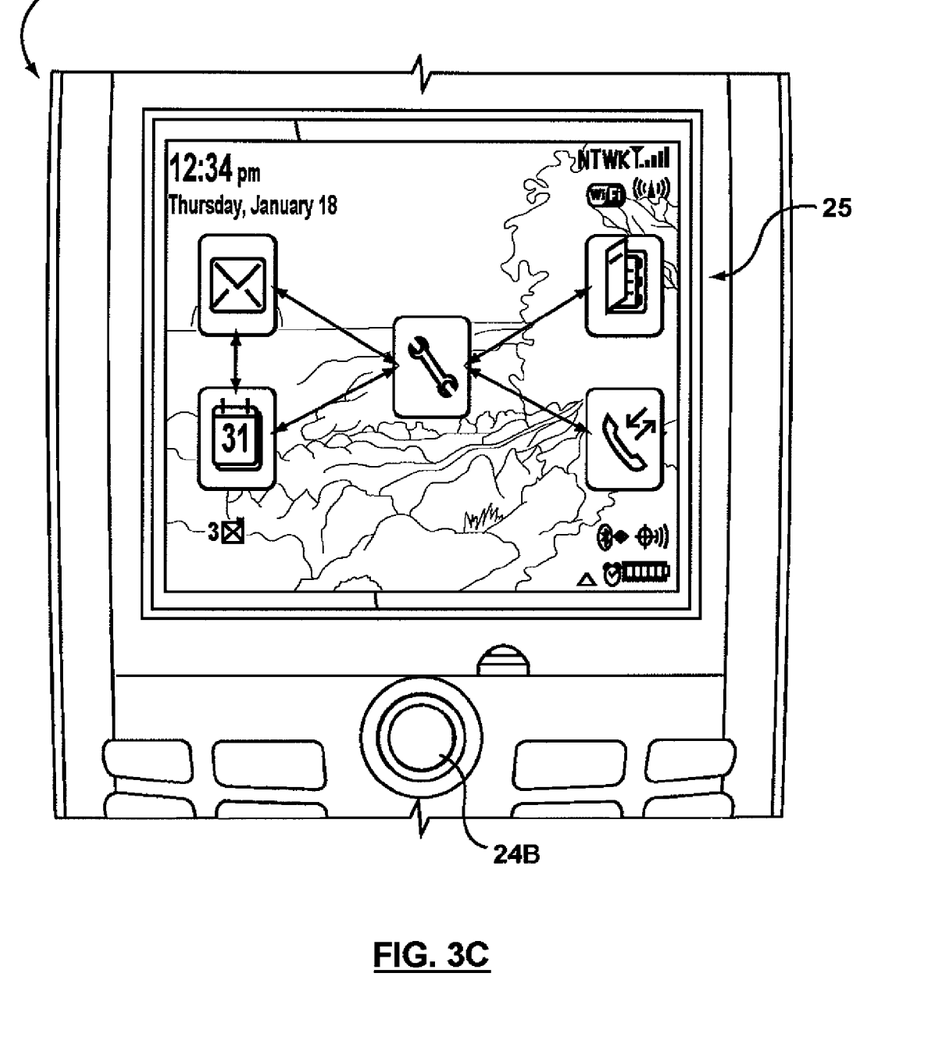

In the example of FIG. 3C, two columns of application icons are provided with one application icon (Options) serving as the center point. Navigation between icons in a single column is effected by pushing trackball 24B up or down (e.g. navigating between Messages and Calendar) and navigation to the other column is effected by navigating through the center icon (Options). Therefore, in order to navigate between application icons on the home screen theme of FIG. 3C, more than one type of memory functionality is required. For example, if focus moves from Messages to Calendar, then to Options, Address Book, Phone and finally back to Options, if trackball 24B is next pushed left from Options, a memory configuration must be provided to select which of Messages or Calendar is put in focus.

According to the 'one-step memory' navigation model discussed above, device 12 remembers that the Options icon obtained focus from Phone. However, Phone is not an application that can be reached by pushing trackball 24B to the left. Thus, under the 'one-step' model, it is not possible to "remember" that the shift in focus to Options from the left column originally came from the Calendar application.

Therefore, as described in greater detail below, a "full" or "directional" memory configuration is provided so that instead of remembering only which application focus has been obtained from, device 12 remembers each last application in each direction from which focus has been obtained. In the example of FIG. 3C, the device 12 therefore remembers that the Options application icon has received focus from the Calendar application icon in the left column such that when trackball 24B is next pushed left, focus returns to the Calendar application. If trackball 24B is next pushed up to Messages and right to Options, Messages then replaces Calendar as the application icon that gains focus when trackball 24B is next pushed left from Options.

Figure 3D:
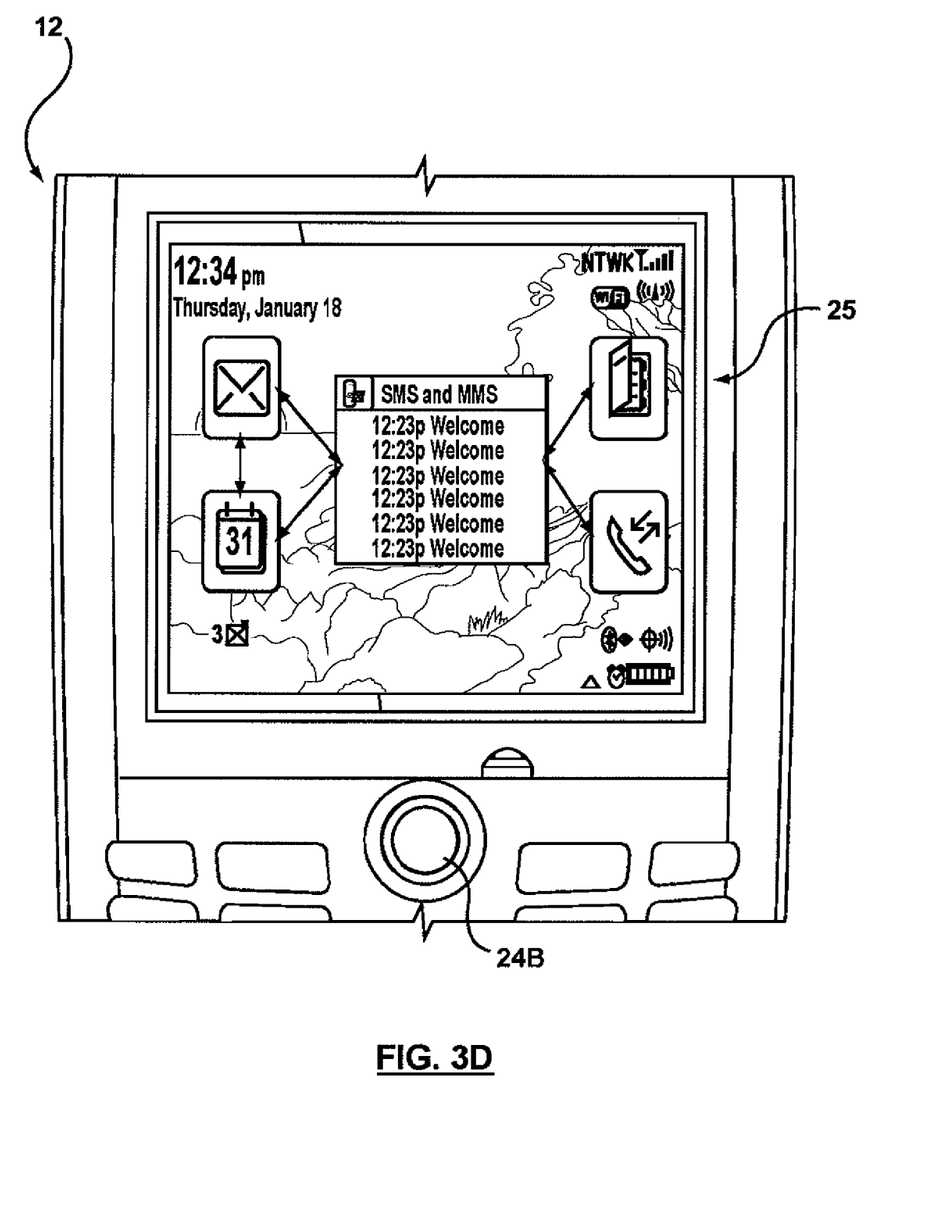

The example of FIG. 3D is similar to the example of FIG. 3C with the exception that the Options application in the center is replaced with a group application (SMS and MMS) and its corresponding sub-entries (individual unread "Welcome" messages). Therefore, as described in greater detail below, a "group" memory configuration is provided so that items may be grouped together and handled as a single atomic unit. For group navigation according to the "group" memory configuration, focus moves are only recorded when focus leaves the group. Thus, pushing trackball 24B left and right records focus, whereas vertical navigation within the sub-entries are not recorded. When using the "group" memory configuration focus points must be placed inside a logical group construct used to record and remember the focus points from which the focus is obtained.

Figure 4A:
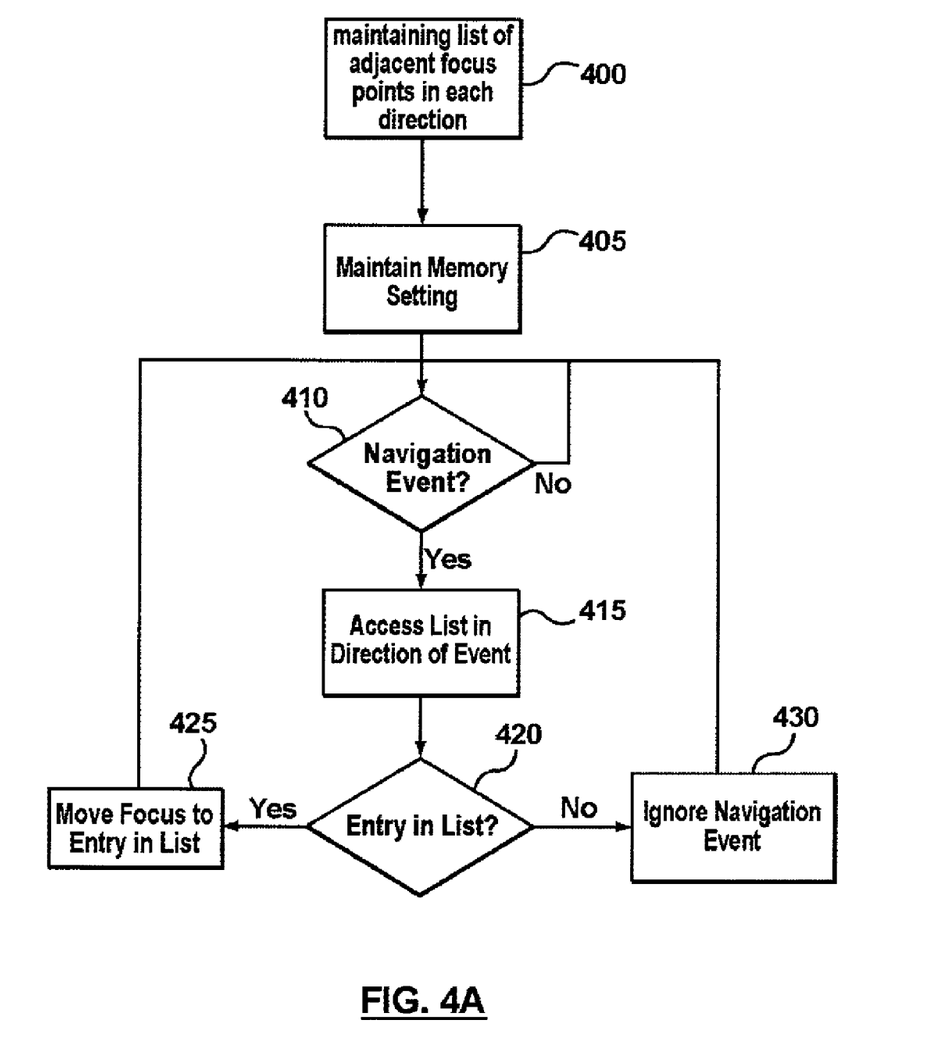
FIGS. 4A-4D, are flowcharts showing exemplary methods of navigating between different focus points displayed on the electronic device of FIG. 2 for the exemplary home screen configurations of screen shot representations of FIGS. 3A-3D, according to four respective memory settings.
Figure 4B:
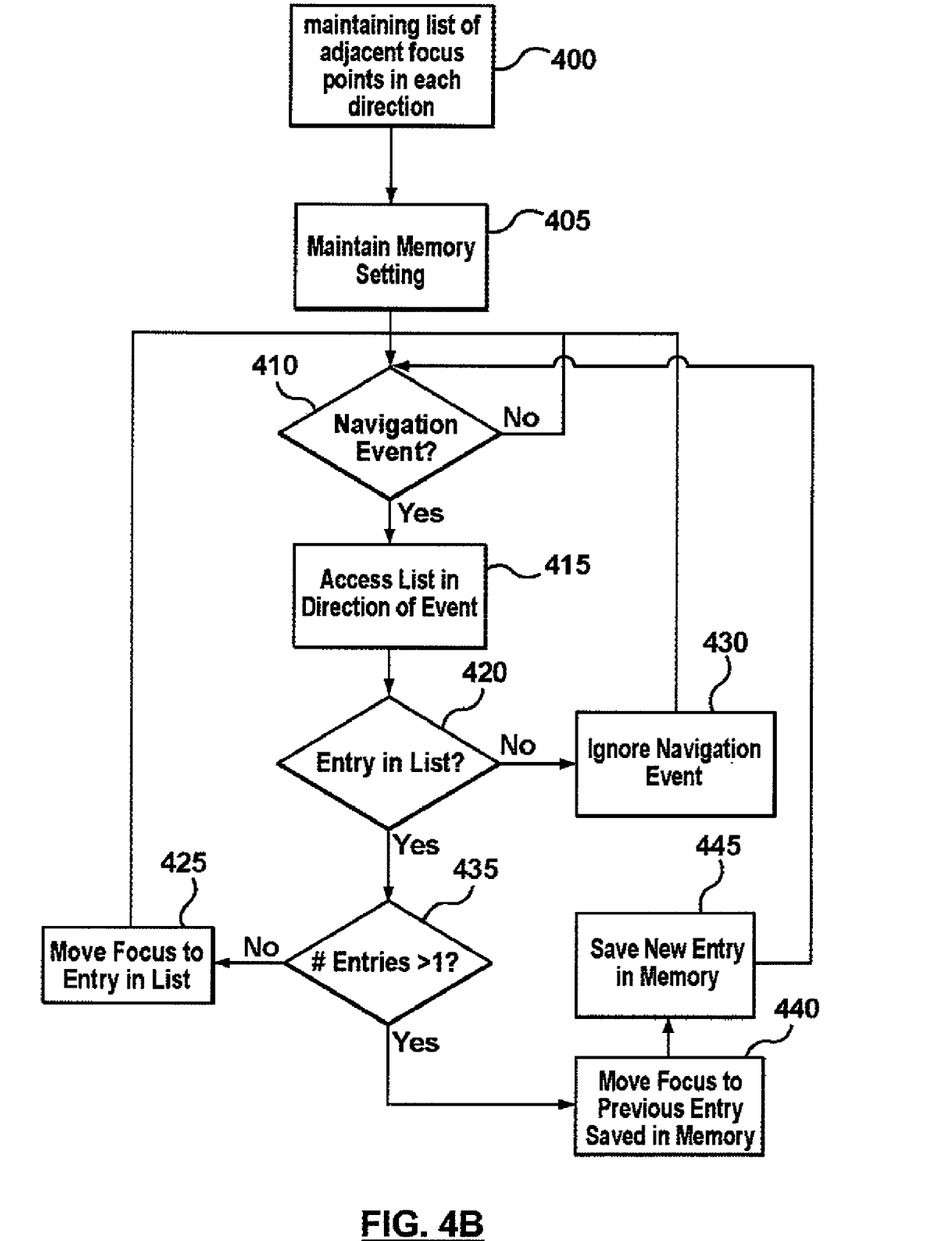
Figure 4C:
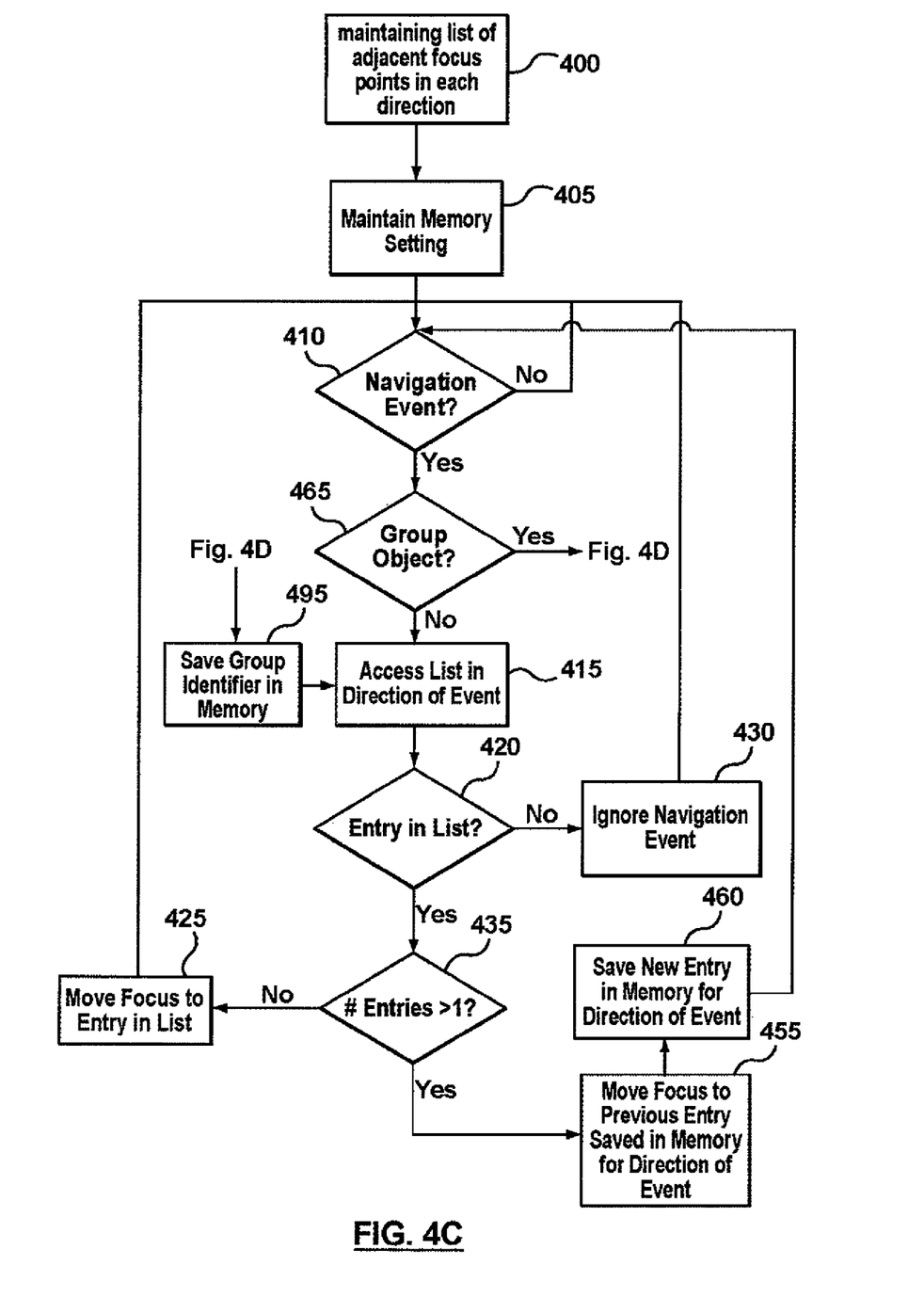
Figure 4D:
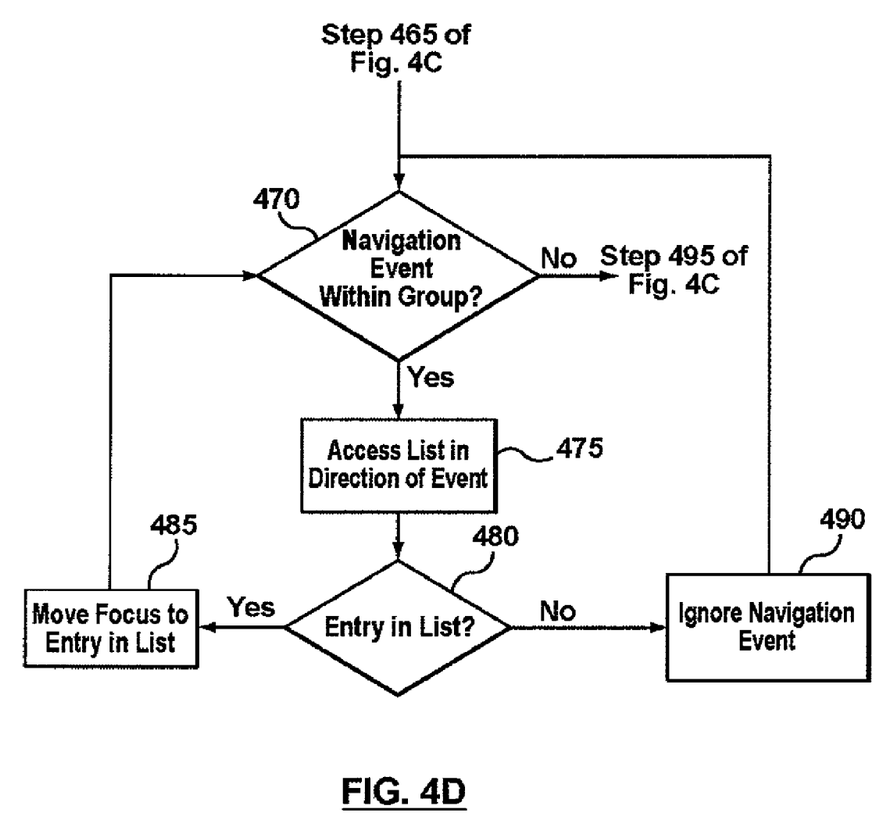

With reference to each of FIGS. 4A-4D, a method is provided for navigating between different focus points displayed on electronic device 12. At step 400, a list is maintained in memory 22, for each focus point, of any adjacent focus points to which focus can move in each direction, responsive to a navigation event in that direction. Therefore, each list may contain zero (empty list) or more focus points to which focus can move in a given direction. If the list is empty (Nil) for a particular direction, then navigation movements in that direction are ignored. If the list contains only one entry, then the application associated with the icon identified by that entry always receives focus when a navigation event in that direction is received. If the list contains more than one entry, then the focus point that receives focus is determined by a memory setting. More particularly, a memory setting is maintained (step 405) such that for each list having more than one adjacent focus point for movement of focus is resolved between the multiple adjacent focus points. According to an exemplary embodiment, four memory settings are provided, as follows: None (FIG. 4A), One-step (FIG. 4B), Full (FIG. 4C) and Group (FIG. 4D).

In the method of FIG. 4A, wherein the memory setting is "None", focus is always given to the first application in the list. This memory setting is useful for a home screen theme such as depicted in FIG. 3A, in which case the following lists are maintained in memory 22:

| List | Up | Down | Left | Right |
|---|---|---|---|---|
| Options | Messages | Phone | Calendar | Address Book |
| Calendar | Nil | Nil | Nil | Options |
| Phone | Options | Nil | Nil | Nil |
| Messages | Nil | Options | Nil | Nil |
| Address Book | Nil | Nil | Options | Nil |

Thus, at step 410, responsive to a navigation event, the foregoing lists are accessed in memory 22 (step 415) according to the direction of the navigation event. If there is an entry in the list for that direction (i.e. a "Yes" at step 420), then focus is moved to the icon entry in the list (step 425). Otherwise, the navigation event is ignored (step 430). Thus, for each list having only one adjacent focus point focus moves to that one adjacent focus point (i.e. the "None" memory setting provides consistent prediction of which application will receive focus).

In the method of FIG. 4B, wherein the memory setting is "One-step", memory 22 stores the identifier of the focus point from which focus was last received. With reference to FIG. 3B, the following information is maintained in memory 22:

| List | Up | Down | Left | Right |
|---|---|---|---|---|
| Calendar | Nil | Nil | Messages/Phone (One-step memory) | Nil |
| Phone | Messages | Nil | Nil | Calendar |
| Messages | Nil | Phone | Nil | Calendar |

Thus, in the event that there is more than one entry in the list for a particular direction (i.e. a "Yes" at step 435), focus moves to the previous entry from which focus last moved (step 440). The memory 22 is then updated to reflect the new "previous" adjacent focus point (step 445). The one-step identifier is stored in a generic variable that is not associated with navigation direction. When focus leaves a current focus point, the exemplary method accesses 22 memory to identify the previous focus point in the direction list and if present, gives focus to that point. Thus, in the example of FIG. 3B, one of either Message or Phone is saved in the one-step memory 22 such that when moving focus to the left from the Calendar, the previous one of Message or Phone is selected. If no value has been stored in the one-step memory 22, then by default the first application in the list is selected (i.e. Messages in the example of FIG. 3B).

The Full memory setting saves the identifier of the point from which focus was received and stores it in one of four variables, each one associated with a direction. Thus, the navigation method of FIG. 4C is similar to that of FIG. 4B except that when focus leaves a current point, the appropriate directional memory variable is checked in memory 22. More particularly, if more than one direction of navigation is possible then if the identifier can be found in the list of focus points for that direction, focus is moved to that focus point (step 455) and the memory 22 is updated with the new directional variable (step 460). If the variable is unassigned, focus is given to the first point in the list.

Thus, for the exemplary home screen of FIG. 3C, the following information is maintained in memory 22:

| List | Up | Down | Left | Right |
|---|---|---|---|---|
| Options | Nil | Nil | Messages/Calendar | Address Book/Phone |
| Calendar | Messages | Nil | Nil | Options |
| Address Book | Nil | Phone | Options | Nil |
| Phone | Address Book | Nil | Options | Nil |
| Messages | Nil | Calendar | Nil | Options |

It will be noted that the Left entry in the Options list is "Messages/Calendar" and the Right entry is "Address Book/Phone", indicating that the memory variable for the Left entry is one of either Messages or Calendar based on which one of Messages or Calendar the Options icon received focus from to its left, and the memory variable for the Right entry is one of either Address Book or Phone based on which one of Address Book or Phone the Options icon received focus from to its right.

The Group memory setting is used to logically group a set of points into an atomic unit. Thus, referring again to FIG. 4C, if focus moves to such a group object (i.e. a "Yes" at step 465), then additional focus moves between items within the group are effected in accordance with the direction of the navigation events but without remembering movement between focus points in the group. The points that use the Group memory setting must be children of a group object and store the identifiers in the parent object.

More particularly, with reference to FIG. 4D, once focus has moved within the group, if the navigation event points to an item within the group (i.e. a "Yes" at step 470), lists are accessed in memory 22 (step 475) according to the direction of the navigation event. If there is an entry in the list for that direction (i.e. a "Yes" at step 480), then focus is moved to the child entry in the list (step 485). Otherwise, the navigation event is ignored (step 490). If the navigation event is not within the group (i.e. a "No" at step 470), then focus leaves the group and the identifier for the group is stored (step 495 in FIG. 4C). The parent group object must have a memory setting other than "Group" and follow the rules for that setting when deciding where focus should move to (steps 415 et seq).

Specific embodiments have been shown and described herein. However, modifications and variations may occur to those skilled in the art. For example, although the exemplary embodiment has been described in terms of implementation on a portable handheld electronic device, the principles set forth herein may be applied to other devices such as desktop computers, etc. All such modifications and variations are believed to be within the sphere and scope of the present embodiment.

The invention claimed is:

1. A method of navigating between different focus points displayed on an electronic device, comprising:
for each of said different focus points maintaining a list of any adjacent ones of said focus points to which focus can move in each direction;
for each said list having more than one adjacent focus point maintaining a memory setting for resolving focus moves as between said adjacent focus points; responsive to a navigation event, for each said list having only one adjacent focus point moving focus to said one adjacent focus point, and for each said list having more than one adjacent focus point accessing said memory setting and moving focus to a predetermined one of said adjacent focus points in accordance with said memory setting; and
displaying said focus points in a home screen configuration according to a predetermined theme arrangement, wherein said predetermined theme arrangement comprises a first plurality of focus points disposed on one side of a further focus point and a second plurality of focus points disposed on another side of said further focus point, wherein navigation in a direction from any one of said first plurality of focus points toward said further focus point results in focus moving to said further focus point and further navigation from said further focus point in said direction toward any one of said second plurality of focus points moves focus to said one of said second plurality of focus points, and navigation in an opposite direction from said one of said second plurality of focus points toward said further focus point results in focus moving to said further focus point and further navigation in said opposite direction toward one of said first plurality of focus points returns focus to said one of said first plurality of focus points.

2. The method of claim 1, wherein said memory setting causes focus to move to the first focus point in said list.

3. The method of claim 2, wherein said one of said adjacent focus points is a logical group of focus points and said memory setting causes focus to move between the focus points in said group irrespective of said list.

4. The method of claim 1, wherein said memory setting causes focus to move to one of said adjacent focus points in said list from which focus was last received.

5. The method of claim 4, wherein said one of said adjacent focus points is a logical group of focus points and said memory setting causes focus to move between the focus points in said group irrespective of said list.

6. The method of claim 1, wherein said memory setting causes focus to move to one of said adjacent focus points in said list associated with the direction of said navigation event and from which focus was last received.

7. The method of claim 6, wherein said one of said adjacent focus points is a logical group of focus points and said memory setting causes focus to move between the focus points in said group irrespective of said list.

8. The method of claim 1, wherein said multiple directions are up, down, left and right.

9. The method of claim 1, wherein said predetermined theme arrangement comprises a plurality of focus points surrounding a further central focus point, wherein navigation in any direction from said central focus point results in focus moving to one of said plurality of focus points positioned in said direction, and navigation from one of said plurality of focus points said in an opposite direction returns focus to said central focus point.

10. The method of claim 1, wherein said predetermined theme arrangement comprises a plurality of focus points disposed to one side of a further focus point, wherein navigation in a direction from any one of said plurality of focus points toward said further focus point results in focus moving to said further focus point, and navigation from said further focus point toward any one of said plurality of focus points returns focus to a predetermined one of said plurality of focus points.

11. The method of claim 1, wherein said predetermined theme arrangement comprises a plurality of focus points disposed to one side of a further focus point, wherein navigation in a direction from any one of said plurality of focus points toward said further focus point results in focus moving to said further focus point, and navigation from said further focus point toward any one of said plurality of focus points returns focus to said one of said plurality of focus points.

12. The method of claim 1, wherein said further focus point comprises a logical group of focus points arranged in a list of items such that navigation from one item to an adjacent item results in focus moving to said adjacent item.

13. The method of claim 1, wherein said focus points comprise display icons for launching Options, Messages, Address Book, Phone and Calendar applications on said electronic device.

* * * * *

UNITED STATES PATENT AND TRADEMARK OFFICE
CERTIFICATE OF CORRECTION

PATENT NO. : 8,174,498 B2
APPLICATION NO. : 12/390984
DATED : May 8, 2012
INVENTOR(S) : Christopher Dale Billard and Eric Mah Page 1 of 1

It is certified that error appears in the above-identified patent and that said Letters Patent is hereby corrected as shown below:

Title Page;

At (73) Assignee, delete "Research In Motion Corporation" and insert -- Research In Motion Limited --.

Signed and Sealed this
Ninth Day of July, 2013

Teresa Stanek Rea
*Acting Director of the United States Patent and Trademark Office*